United States Patent
Hansen et al.

(10) Patent No.: US 7,206,796 B2
(45) Date of Patent: Apr. 17, 2007

(54) SYSTEM AND METHOD FOR SYNCHRONIZING MULTIPLE DATABASE FILES

(75) Inventors: J. Peter Hansen, Bellevue, WA (US); Vincent H. Curley, Seattle, WA (US); Neil W. Black, Redmond, WA (US); Jennifer R. Mead, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/202,736

(22) Filed: Aug. 12, 2005

(65) Prior Publication Data

US 2005/0278392 A1 Dec. 15, 2005

Related U.S. Application Data

(62) Division of application No. 09/615,182, filed on Jul. 13, 2000, now Pat. No. 7,013,316.

(51) Int. Cl.
*G06F 17/30* (2006.01)
(52) U.S. Cl. ............... 707/204; 707/102; 707/205
(58) Field of Classification Search ..... 707/100–104.1, 707/200–206
See application file for complete search history.

(56) References Cited

U.S. PATENT DOCUMENTS

| | | | |
|---|---|---|---|
| 5,261,094 A | 11/1993 | Everson et al. | |
| 5,491,820 A | 2/1996 | Belove et al. | |
| 5,649,195 A | 7/1997 | Scott et al. | |
| 5,758,355 A | 5/1998 | Buchanan | |
| 5,970,502 A | 10/1999 | Salkewicz et al. | |
| 6,065,018 A * | 5/2000 | Beier et al. | 707/202 |
| 6,169,994 B1 * | 1/2001 | Lennert et al. | 707/104.1 |
| 6,226,650 B1 | 5/2001 | Mahajan et al. | |
| 6,321,236 B1 | 11/2001 | Zollinger et al. | |
| 6,704,737 B1 * | 3/2004 | Nixon et al. | 707/101 |
| 6,847,984 B1 * | 1/2005 | Midgley et al. | 707/204 |

* cited by examiner

*Primary Examiner*—Isaac Woo
(74) *Attorney, Agent, or Firm*—Christensen O'Connor Johnson Kindness PLLC (57) ABSTRACT

A system and method for efficiently synchronizing multiple databases stored on multiple computing devices. The method and system provides a duplicated database configuration where a database can either be stored only on a plurality of client computers, or on at least a client computer and a server computer. This duplicated database configuration allows users to access a database from a plurality of client computers that are communicatively connected to a server computer.

14 Claims, 7 Drawing Sheets

SYSTEM AND METHOD FOR SYNCHRONIZING MULTIPLE DATABASE FILES

CROSS-REFERENCE TO RELATED APPLICATION

This application is a divisional of prior application Ser. No. 09/615,182, filed Jul. 13, 2000 now U.S. Pat. No. 7,013,316, priority from the filing date of which is hereby claimed under 35 U.S.C. § 120.

FIELD OF THE INVENTION

The present invention relates to client-server computer communications and, in particular, to a method and system for synchronizing multiple databases.

BACKGROUND OF THE INVENTION

As known to those skilled in the art, the term "Internet" refers to the vast collection of computers and network devices that use various protocols to communicate with one another. A "client" computer connected to the Internet can download digital information from "server" computers connected to the Internet. Client application software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hypertext Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites located around the world that maintain and distribute electronic documents. A Web site may use one or more Web server computers that store and distribute documents in one of a number of formats including the Hypertext Markup Language (HTML). An HTML document contains text and metadata such as commands providing formatting information. HTML documents also include embedded "links" that reference other data or documents located on any Web server computer. The referenced documents may represent text, graphics, or video in respective formats.

A Web browser is a client application or operating system utility that communicates with server computers via FTP, HTTP, and Gopher protocols. Web browsers receive electronic documents from the network and present them to a user. Internet Explorer, available from Microsoft Corporation, Redmond, Wash., is an example of a popular Web browser application.

In a network computing environment, as described above, some computer systems are configured to maintain a number of duplicated databases stored on a server computer (a Web server), and a plurality of client computers. For example, Web servers that transmit a substantial amount of data to client computers utilize database designs configured to store application data on a client computer as well as on the Web server. This duplicated database configuration allows client computers to perform certain operations without having to establish a network connection with a particular Web server. The distributed database configuration is also well-suited for client computers that are connected to a network through a slow data connection or via temporary connections such as a remote telephone connection.

One illustrative example of a computer system that is configured to maintain a number of duplicated databases stored on a plurality of client computers can be found at a financial Web site, such as one provided by Microsoft Corporation at the Web address, MONEYCENTRAL.MSN-.COM. The Web server for the MoneyCentral Web site utilizes a duplicated database configuration where at least two client computers share a database with common data. This configuration allows a client computer to perform certain operations using the information stored on the client computer database without having to establish a network connection to the Web server while still allowing multiple client computers to share the database through a Web server.

The above-described duplicated database configuration presents some difficulties. Because of the nature of the mobility of users on large networks, such as the Internet, it is likely that one user may use more than one client computer to access a Web server. This may cause version control errors in the synchronization of duplicated databases because one client computer database may be different from a second client computer database. More specifically, when a particular client computer attempts to synchronize its database with the Web server, it is difficult for the Web server to determine if the client computer contains the most recent database. For example, if a user accesses a Web server from a client computer located at their office and another client computer located at their home, the Web server may not correctly update the Web server database if data is changed at both client computers. In this scenario, it is difficult to maintain and identify the duplicated databases stored in the client computers. In addition, it becomes increasingly difficult to identify the most recent information in client computer databases when the data of the Web server database is simultaneously changed by more than one client computer.

Accordingly, there is a need for a method and system for efficiently managing and synchronizing a plurality of duplicate databases stored on a server computer and more than one client computer. There is also a need for a method and system that identifies the most recent database between a plurality of duplicate client computer databases that may be simultaneously accessing a server computer database.

SUMMARY OF THE INVENTION

In accordance with the present invention, a system and method for efficiently synchronizing multiple databases stored on multiple computing devices are provided. The method and system provides a synchronized databases either stored on a plurality of client computers, on a client computer and a server computer, or on a plurality of client computers and a server computer. Duplicated databases allow users to access and manipulate data from one or more computers that are communicatively connected to the server computer for synchronization. The method and system also allows the server computer to update the client computer databases while minimizing the amount of data transferred between the server and client computers.

According to one form of the present invention, a database format is provided that contains a plurality of data objects. Each data object can be used to store any type of data depending on the application of the database. Each data object also contains several data attributes that identify a last modification time. Every time a modification is made to the data object, the last modification time in the data object is updated. In addition to storing the last modification time for each data object, databases stored in client computers also store a last modification time indicating the last time the database synchronized with another database. The databases stored in server computers store a database creation time indicating a time at which the server computer database is first written. Each time value, the server computer database creation time, last modification time for the client computer database and last modification time for each data object, includes a time, preferably including hours, minutes and seconds, and a day, preferably including year, month, and date.

In one embodiment, the method and system synchronizes the databases between a client computer and a server computer by selectively downloading database objects from the server computer database, thereby minimizing the amount of data transferred between the client and server computers. The synchronization routine selectively downloads database objects based on a comparison of a last server access time stored in the client computer database and a database creation time stored in the server computer database. The last server access time stored in the client computer database indicates the last time the database was synchronized with another database. If the last server access time stored in the client computer database is earlier than the database creation time stored in the server computer database, the server computer downloads the entire server computer database to the client computer. If the last server access time stored in the client computer database is not earlier than the database creation time stored in the server computer database, the server computer only downloads new database objects from the server computer to the client computer.

In accordance with another aspect of the present invention, the synchronization routine also reduces the likelihood of synchronization errors by detecting expired client computer databases. If, based on an arbitrary period of time, a particular client computer database is expired, the server computer replaces the client computer database with the server computer database.

In accordance with other aspects of the present invention, the synchronization routine synchronizes the data from the server computer to the client computer. New data provided by the client computers is updated into the server computer database by an initialization routine or entered in real-time by a database application. After the server computer database updating is finished, the client computer database is synchronized with the server computer database. This eliminates the possibility that data could be lost if multiple clients are writing to the server computer database at the same time.

In accordance with another aspect of the present invention, the synchronization routine allows users to store a database solely on client computers, thereby providing added data storage security, or alternatively store a mirrored (duplicated) database, on a server computer as well as one or more client computers. The duplicated database configuration provides the user with the ability to access the server computer database from a number of computers communicatively connected to the server computer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention provides a system and method for efficiently synchronizing duplicated databases stored on a server computer and one or more client computers, or stored on multiple client computers. More specifically, the present invention provides a method for efficiently synchronizing multiple databases stored on a plurality of computing devices while minimizing the amount of data transferred between the computing devices. The method and system provides duplicated databases stored either only on client computers, or on one or more client computers and a server computer. The configuration having databases stored only on client computers provides the user with added security by not making the database potentially available to other external client computing devices having access to the server computer. The duplicated database configuration provided by the invention allows users to access a database from a plurality of client computers that are communicatively connected to a server computer during synchronization. The system and method of the present invention allows the server computer database to synchronize with multiple client computer databases regardless of the order in which the client computer databases synchronize with the server computer database.

In one embodiment, the method and system synchronizes the databases between a client computer and a server computer by selectively downloading database objects from the server computer database, thereby minimizing the amount of data transferred between the client and server computers. The synchronization routine selectively downloads database objects based on a comparison of stored time indicators, the last server access time stored in the client computer databases and the database creation time stored in the server computer database. The last server access time indicates the last time the database was accessed (synchronized) with another database. If the last server access time stored in the client computer database is earlier than the database creation time stored in the server computer database, the server computer downloads the entire server computer database to the client computer. If the last server access time stored in the client computer database is not earlier than the database creation time stored in the server computer database, the server computer only downloads new database objects from the server computer to the client computer. The synchronization routine also provides a feature for reducing the likelihood of synchronization errors by detecting expired client computer databases. If a particular client computer database is expired, where a database expiration is based on an arbitrary time period, the server computer replaces the client computer database with the server computer database.

Figure 1A:
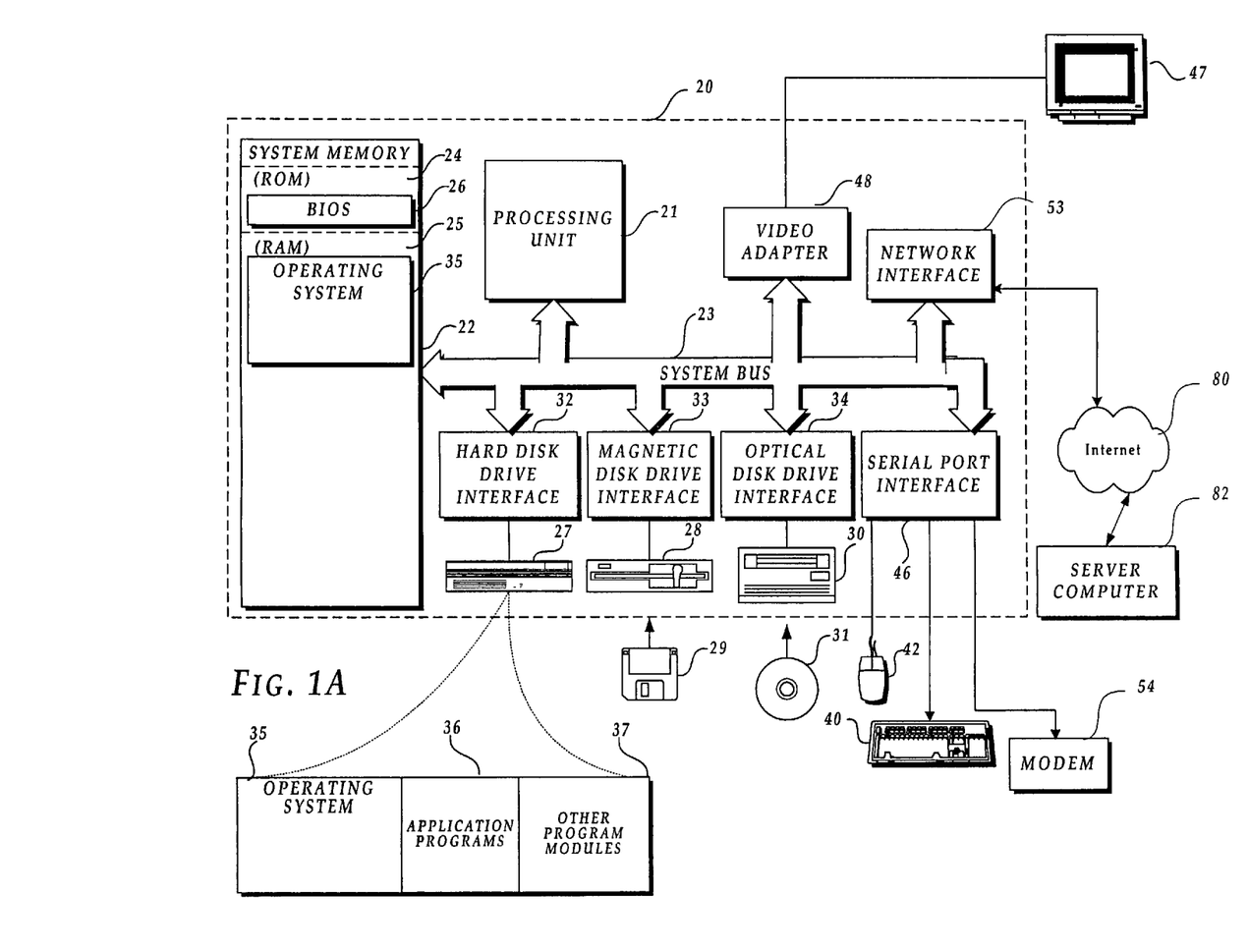
FIG. 1A is a block diagram illustrating a client computer for implementing the invention.

With reference to FIG. 1A, an exemplary system for implementing the invention includes a general purpose computing device in the form of a conventional personal computer 20, also referred to as a client computer 20. The client computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAM), read only memories (ROM), and the like, may also be used in the exemplary operating environment.

A number of program modules may be stored on the hard disk 27, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and/or a pointing device such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor and speakers, client computers typically include other peripheral output devices, such as printers.

The client computer 20 operates in a networked environment using logical connections to one or more remote computers, such as a server computer 82 or another client computer 60. More specifically, each remote computer may be another personal computer, a server, a router, a network PC, a peer device or other common network node, and typically includes many or all of the elements described above relative to the client computer 20. The logical connections depicted in FIG. 1A include a local area network (LAN) and a wide area network (WAN). Such networking environments are commonplace in offices, enterprise-wide computer networks, etc., which may or may not include the Internet. However, for ease of illustration, such networks are collectively depicted as the Internet 80 in FIG. 1A. As depicted in FIG. 1A, the remote computers 60 and 82 communicate with the client computer 20 via the Internet 80.

When used in a LAN networking environment, the client computer 20 may be connected to a local network through a network interface or adapter 53. The local network (not shown) is connected to other parts of the Internet 80. When used in a WAN networking environment, the client computer 20 typically includes a modem 54 or other means for establishing communications with the wide area network, which may be formed by the Internet 80. The modem 54, which may be internal or external, is connected to the system bus 23 via the serial port interface 46. In a networked environment, program modules depicted relative to the client computer 20, or portions thereof, may be stored in any of the illustrated and/or described remote memory storage devices. It will be appreciated that the network connections shown are exemplary and other means of establishing a communications link between the computers may be used.

Figure 1B:
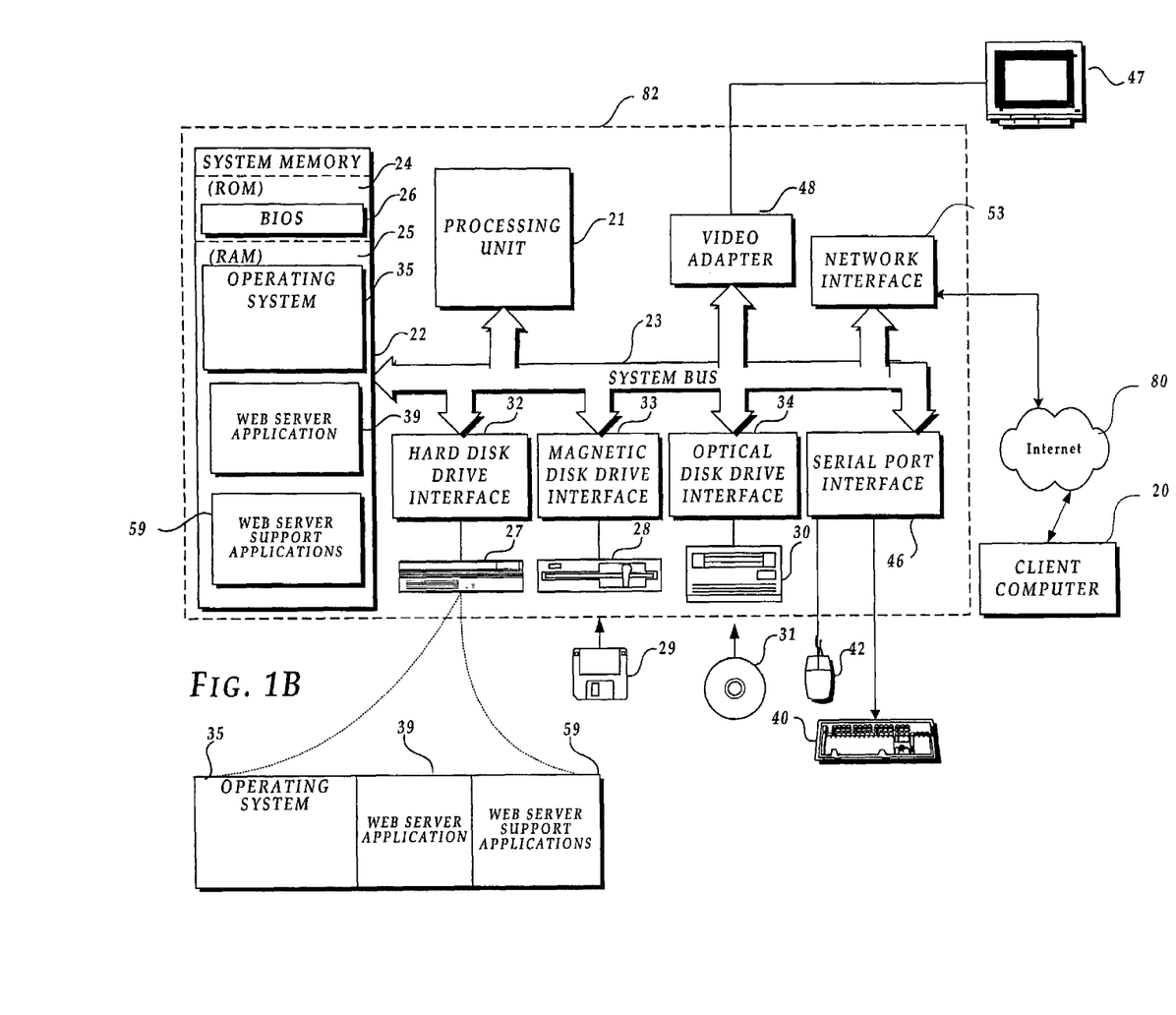
FIG. 1B is a block diagram illustrating a server computer for implementing the invention.

With reference to FIG. 1B, an exemplary Web server (hereinafter "server computer 82") for implementing the invention is shown. The server computer 82 may be used to implement one embodiment of the present invention, which includes many components depicted in FIG. 1A, such as the processing unit 21, video adapter 48, system bus 23, hard drive 27, and other devices known in the art. However, the server computer 82 preferably includes a larger hard drive 27 and more memory capacity in the random access memory (RAM) 25 compared to the client computer 20. The RAM 25 includes an operating system 35, a Web server application 39, and other supporting software 59 for the Web server application 39. Similar to the client computer 20 of FIG. 1A, the network interface 53 of the server computer 82 is communicatively connected to a network such as the Internet 80 which allows the server computer 82 to communicate to a plurality of client computers having a construction similar to the client computer 20 depicted in FIG. 1A.

One exemplary implementation of the present invention involves the application of financial management programs. In such exemplary implementations, a financial management program uses the method and system of the present invention to manage duplicated databases stored on more than one computer. The financial management program used in this exemplary implementation also provides users with the ability to store investment portfolio information in the databases, such as, the user's investment holdings and transactions. In this exemplary implementation, the system involves a server computer 82, a first client computer 20, e.g., a home computer, and a second client computer 60, e.g., an office computer.

Before the synchronization process is executed, the system and method of the present invention allows a user of the client computer to configure the databases in an initialization routine. The initialization routine instructs the user to chose between one of two database configurations. In one configuration, the user may store a database solely on client computers. This disables the user's ability to view the user's portfolio from multiple computers that do not include a duplicated copy of the database. This provides the user with a high level of data access security. In another configuration, the user may store the database on the server computer in addition to one or more client computers. This allows the user to access the database from any client computer that can be connected to the server computer. Regardless of the database configuration, the method and system of the present invention always stores a database on at least one user client computer. Having a database locally stored in a client computer allows the database application to be accessed even when the client computer is not connected to the server computer.

In this exemplary configuration of the invention, by the use of his or her home computer, the user first selects the database configuration before adding data to the database. The system and method of the present invention then creates or deletes databases on the user's home computer and the server computer based on the database configuration selected by the user. As part of this process, if the selected database configuration is to store data on the server and client (home) computers, the server computer sends a server access time to the user's home computer, which stores the server access time in the home computer database. The server access time marks the last time that the home computer database synchronized with the server computer database.

In normal operation of the program, when the user updates the database information from his or her home computer, e.g., in a financial program this may include an action such as adding a stock to an investment portfolio, the user's home computer stores and updates the new information in the server computer database, and not in the client computer database. At predetermined intervals or when the user is done modifying the information in the server computer database, the client computer database is updated by the data on the server computer database by a synchronization routine. Each time the databases are synchronized, the user's home computer automatically checks for the existence of a database on the server computer and transmits the server access time that is stored in the home computer database. If a database exists on the server computer, the server computer downloads the newly created, i.e. updated, database information. The newly created database information is distinguished by the use of the server access time value stored in the home computer database.

One benefit aspect of the present invention is that the synchronization routine eliminates the possibility that data could be lost if multiple clients were writing to the same portfolio on the server computer at the same time. More specifically, because the client computer database synchronization only occurs at periodic intervals or after the server database has been updated, each client computer that accesses the server computer will always receive the new information from any user activity the client computer performed before the database synchronization. This includes any new information added by any other client computer during that time period.

In an exemplary implementation of the invention, a user travels to their office and utilizes his or her office computer to add new information, in real-time, to the server computer database. Periodically, or at the end of the update session, the client computer database is synchronized with the server computer database. During the synchronization or at the start of an initialization routine, the client computer verifies the existence of a database on the server computer. If a database exists, server computer then returns a code to the client computer indicating that a database exists on the server computer. The client computer then prompts the user to determine the database configuration. If the user elects to store the office (client) computer data on the server computer database, the office computer updates the server computer database as the user changes to his or her data. For example, in the financial management program, if the user were to add a stock to his or her portfolio, the office computer would update the server computer database. When the user has completed his or her updates, the client computer database then synchronizes with the server computer database. In the database synchronization, the server computer uses the server access time stored on the client computer database and a database creation time stored on the server computer database to determine what data is to be sent from the server computer to the client computer. Later, if the user synchronizes his or her home computer, the home computer would have the ability to automatically query the server computer for any changes since the user's last session. Similar the office computer, the home computer utilizes the server access time stored on the client computer database and the database creation time stored on the server computer database to determine what data is to be sent from the server computer to the client computer. Thus, the home computer only receives the changes made by the office computer.

Figure 2:
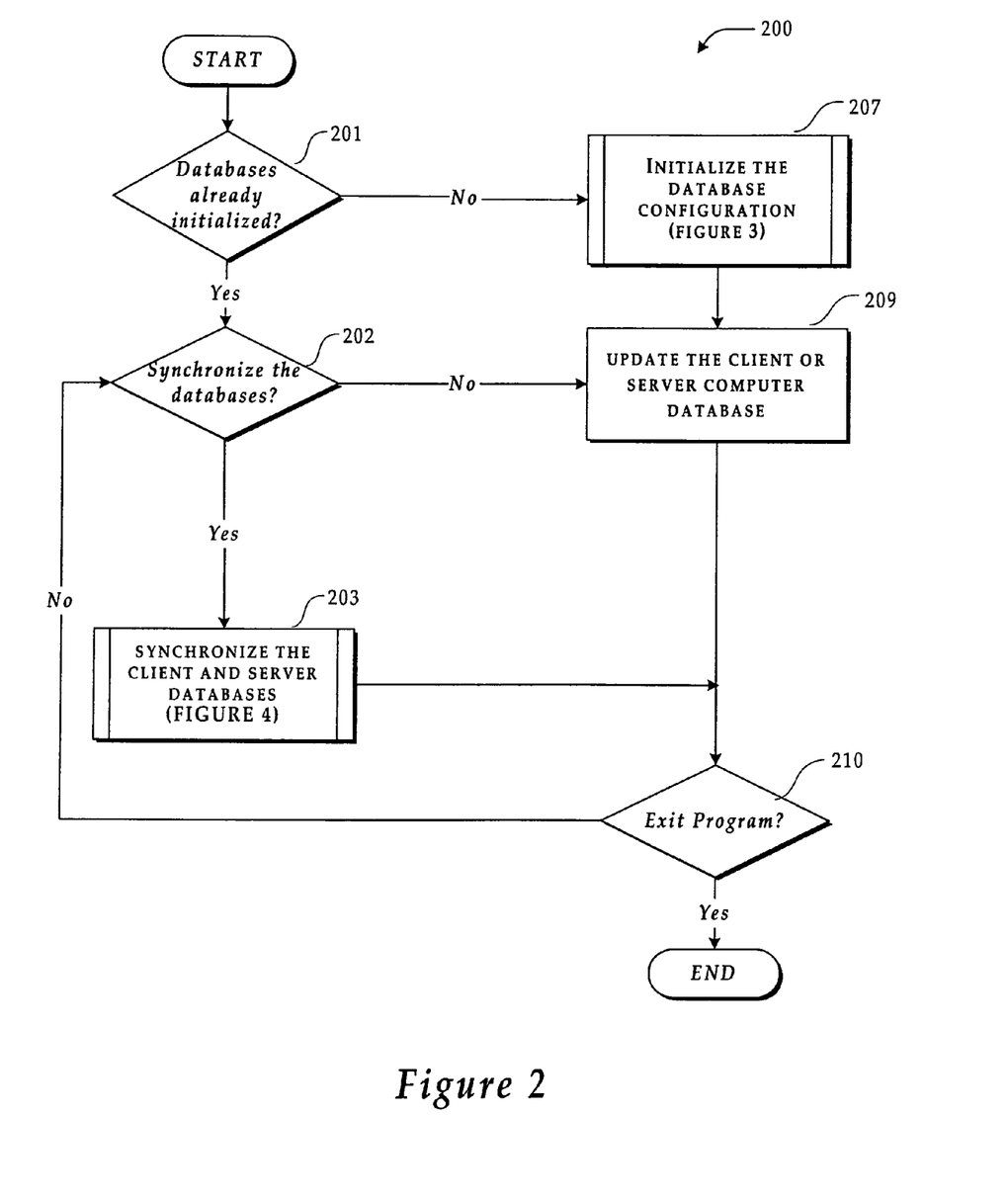
FIG. 2 is a flow diagram illustrating a database initialization and synchronization routine formed in accordance with this invention executed on a client-server computer system.

FIG. 2 illustrates an initialization and synchronization routine 200 formed in accordance with the present invention. The initialization and synchronization routine 200 illustrates the operation of one implementation of the present invention to allow a user of a client computer 20 to update, synchronize and configure the database(s), as described above in the exemplary implementation. This embodiment of the initialization and synchronization routine 200 allows a user to set the database configuration during the use of the database application while also providing a method for synchronizing duplicated databases stored on the client computer 20 and a server computer 82. The initialization and synchronization routine 200 described below is initiated either after the user starts the database application or after the user initiates a database initialization, e.g., by the use of a pull-down menu, while the database application is in normal operating mode.

The initialization and synchronization routine 200 starts at block 201 where the client computer 20 examines the last server access time stored in the client computer database to determine if the client computer database has been initialized. In other words, the process of decision of block 201 checks to see if the client computer database has previously synchronized with another database by checking the time of the last database synchronization. If, at decision block 201, the client computer database does not contain a last server access time, the client computer 20 determines that the client computer database has not been initialized for synchronization. Accordingly, the routine then continues at block 207 where the client computer 20 initializes the database configuration.

In process block 207, the client computer 20 instructs the user to enter his or her desired database configuration for processing in the client computer 20. Upon receiving a user's database configuration selection to store a database on the server computer 82, the client computer 20 updates the server computer database with the data stored in the client computer database. The initialization routine of process block 207 is described in more detail below with reference to FIG. 3. Next, the initialization and synchronization routine 200 continues at block 209. As described below, in process block 209, the client computer 20 updates the server computer database via the database application.

Alternatively, if at decision block 201, the client computer 20 detects a last server access time in the client computer database, the routine continues at block 202 where the client computer 20 determines if client computer database is to be synchronized with a server database. In the process of decision block 202, the client computer 20 may either receive a command from the user to synchronize the client computer database with the server computer database, or the client computer 20 may be configured to automatically synchronize the two databases.

If at decision block 202, the client computer 20 determines that the user does not want to synchronize the two databases, or if the client computer 20 is not configured to automatically synchronize the two databases, the routine then continues to block 209 where the client computer 20 updates the server computer database via the database application. In process block 209, the database application on the client computer 20 is considered to be in a normal operating mode, where the user makes changes to their database information. For example, in an exemplary database program such as a financial program, this may include an action such as adding a stock to an investment portfolio. As described above with reference to the exemplary implementation, in normal operating mode, the database application updates the new information in the server computer database, and not in the client computer database.

If at decision block 202, the client computer 20 determines that the user desires to synchronize the client and server computer databases, or if the client computer 20 is configured to automatically synchronize the two databases, the routine then continues at block 203 where the client computer database is synchronized with the server computer database. The synchronization routine of process block 203 is described in more detail below with reference to FIG. 4. The initialization and synchronization routine 200 routine then loops through the process of blocks 202, 203, 209, and 210, in normal operating mode, until the client computer 20 receives a user command to terminate the database program. The loop of process of blocks 202, 203, 209, and 210 allows the client computer 20 to automatically synchronize the two databases at predetermined time intervals, or allows a user to manually initiate a database synchronization before the database program is terminated.

In addition to the initialization and synchronization routine 200, the present invention also provides a method that allows the user to change the database configuration during the normal operating mode of the database program. At any time during the normal operating mode of the database program, e.g., during the process of the flow diagram of FIG. 2, the user can initiate an initialization routine to add, delete, or update the server computer database. The initialization routine, described below with reference to FIG. 3, can be run at any time during the normal operating mode of the database program so long as the initialization routine is not run during the synchronization routine (process block 203).

Figure 3:
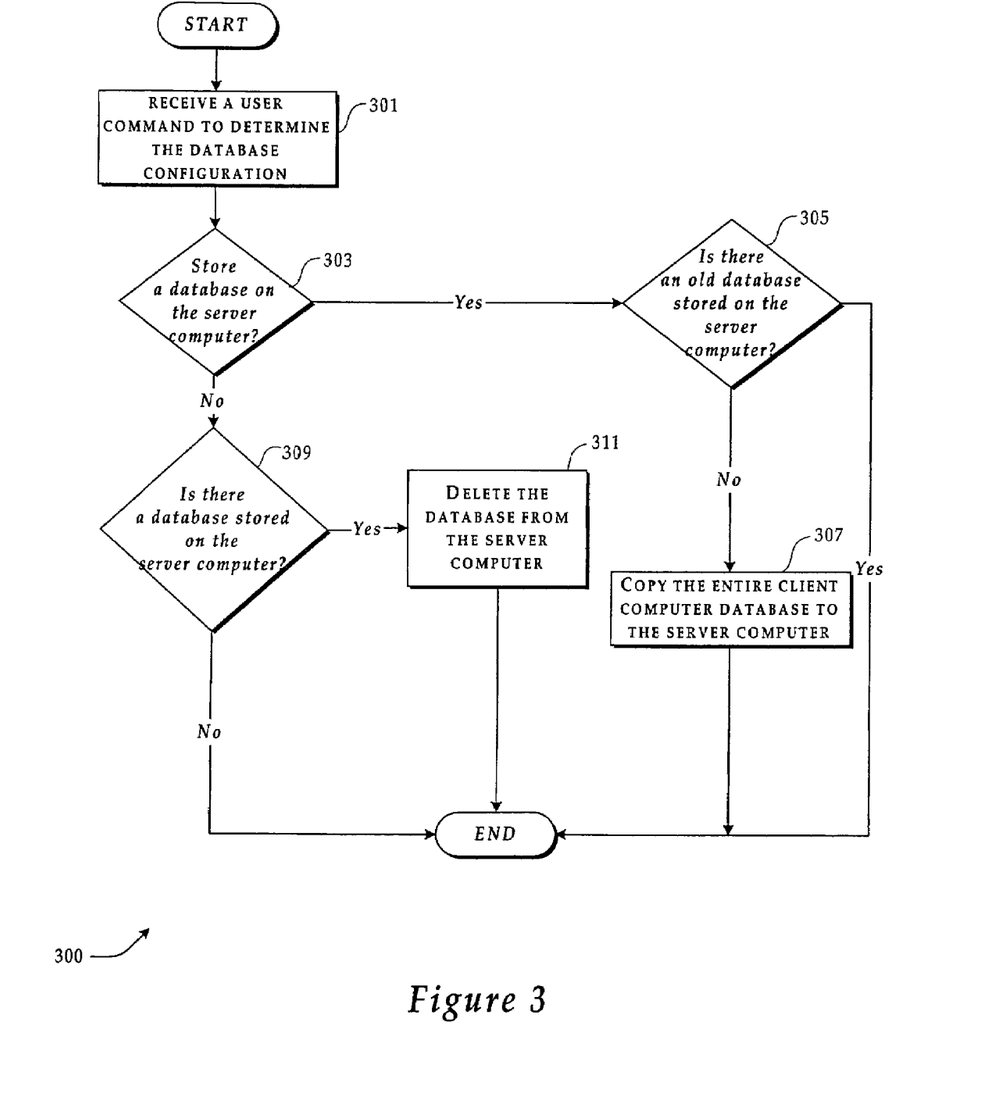
FIG. 3 is a flow diagram illustrating a database initialization routine formed in accordance with this invention executed by a client computer.

FIG. 3 illustrates an initialization routine 300 formed in accordance with the present invention. The initialization routine 300 initializes the databases stored on the client computer 20 and server computer 82. The initialization routine 300 illustrated in FIG. 3 and described below provides a way for a user to initialize a client computer 20 such that the databases stored on the client computer 20 and the server computer 82 are initially synchronized, provided that the program is configured to store a database on the server computer. The database synchronization is maintained the synchronization routine 400 shown in FIG. 4.

The initialization routine 300 starts at block 301 where the client computer 20 receives a command from a user that defines the configuration of the database storage. As mentioned above, the database configuration determines if data is to be stored on the server computer as well as the client computer. The command that determines the database configuration may be a user command communicated by graphical user interface, or the command may be from a computer program, such as an administrative configuration tool or the like. If the command is received by a user, the client computer 20 provides instructions in the graphical user interface which informs the user that they may either store a database solely on the client computer 20 or store the database on the client computer 20 and the server computer 82. The first option provides users with access to the database regardless of the state of their network connection to the server computer as well as an added level of data security. The second option allows the user to store the database on the server computer 82 and access the database from other client computers that have the capability of being connected to the server computer. Regardless of the selected database configuration, a database is always locally stored on the client computer 20.

Upon receiving the database configuration command, the initialization routine 300 continues at block 303 where the client computer 20 determines if the database is to be stored only on the client computer 20 or if the database is to be stored on the server computer 82 in addition to the client computer 20. In process block 303, the client computer 20 makes this determination by examining the command received in process block 301. If at decision block 303, the client computer 20 determines that the database is only to be stored on the client computer 20 and not on the server computer 82, the initialization routine 300 then proceeds to decision block 309 where the client computer 20 determines if there already is a duplicate database stored on the server computer 82.

Part of the process of decision block 309 involves the client computer 20 establishing a connection to the server computer 82. This can be accomplished using any standard database query. The database query should contain sufficient information to identify the correct duplicate database on the server computer 82, such as an ID associated with the database or the user. Since standard database queries are generally known to those skilled in the art, none are specifically described here.

If at decision block 309, the client computer 20 determines that there is no database stored on the server computer 82, the initialization process 300 terminates. Alternatively, if at decision block 309 the client computer 20 determines that a database does exist on the server computer 82, the initialization routine continues to block 311, where the client computer 20 instructs the server computer 82 to delete the database stored on the server computer 82. The client computer instruction to delete the server computer database is a standard database command, one known to those skilled in the art. Once the client computer 20 receives confirmation from the server computer 82 that the database has been deleted, the initialization routine 300 terminates.

The initialization routine 300 includes the block 309 determination because the client computer 20 may have been previously configured to store a database on the server computer 82, at which time, the client computer 20 would have created a database on the server computer 82. Later, the user may decide to eliminate the server computer database and store the database only on the client computer 20. The path through block 311 results in the server computer 82 deleting the duplicate database stored on the server computer 82, thereby changing the database configuration to the current database setting. In a case where no database is stored on the server computer 82, the client computer 20 no longer stores data on the server computer 82, but the client computer 20 may still use the server computer 82 as a source of data or as a data gathering device, such as the use of a Web server application 39.

Returning to decision block 303, if the client computer 20 determines that the user desires to establish a database on the server computer 82, the initialization routine 300 proceeds to decision block 305 where the client computer 20 determines if a duplicate (albeit not necessarily updated) database is stored on the server computer 82. The process of block 305 can be carried out by the use of a standard database query, as described above with reference to block 309.

If, at decision block 305, the client computer 20 determines that there is a database stored on the server computer 82, the initialization routine 300 terminates. However, if at decision block 305, the client computer 20 determines that there is no database stored on the server computer 82, the initialization routine 300 continues at block 307 where the client computer 20 uploads the entire client computer database to the server computer 82. Since computer instructions and methods necessary to upload a database to from one computer to another computer are known to those skilled in the art, none are described here. Once the client computer database is uploaded to the server computer 82, the initialization routine 300 terminates.

After the initialization routine 300 has executed, depending on the database configuration selected in block 301, the client computer 20 maintains the databases in the manner illustrated in FIGS. 4–6 and described below. Under normal operation, prior to synchronization, the client computer 20 updates the database stored in the server computer 82 as data is modified, added, or deleted. The client computer database is then synchronized with the server computer database, where the synchronization occurs either at predetermined intervals or after the user has completed the data modifications. Thereafter, when the user of the client computer 20 switches to a different client computer, the synchronization routine of FIG. 4 is again executed to update the database stored in that different client computer.

To facilitate the synchronization routine of the present invention, a database structure is provided. The system and method of the present invention utilizes a database structure that comprises a plurality of data objects containing information related to the subject matter stored in the database. In addition to the information stored in each data object, each data object contains a data field that stores an access time indicator or value, also referred to as a last server access time (LSAT), which indicates a time when the data object was last modified.

In addition to storing the LSAT for each data object, each database stored on the client computers contains a data field that stores a last server access time (LSAT) for the entire database, which indicates the time when the client computer database was last synchronized with a server computer database. When a client computer 20 synchronizes its database with a server computer database, the LSAT stored in the client computer database is updated with the current time of the server computer, even if no data objects were exchanged between the two databases. The databases stored in server computers store a database creation time, which indicates a time when the server computer database is first written. Each of the stored time values, the server computer database creation time, last modification time for the client computer database and last modification time for each data object, include a time, preferably including hours, minutes and seconds, and a day, preferably including year, month, and date. In addition, each stored time value is updated based on a clock maintained on the server computer 82.

Figure 4:
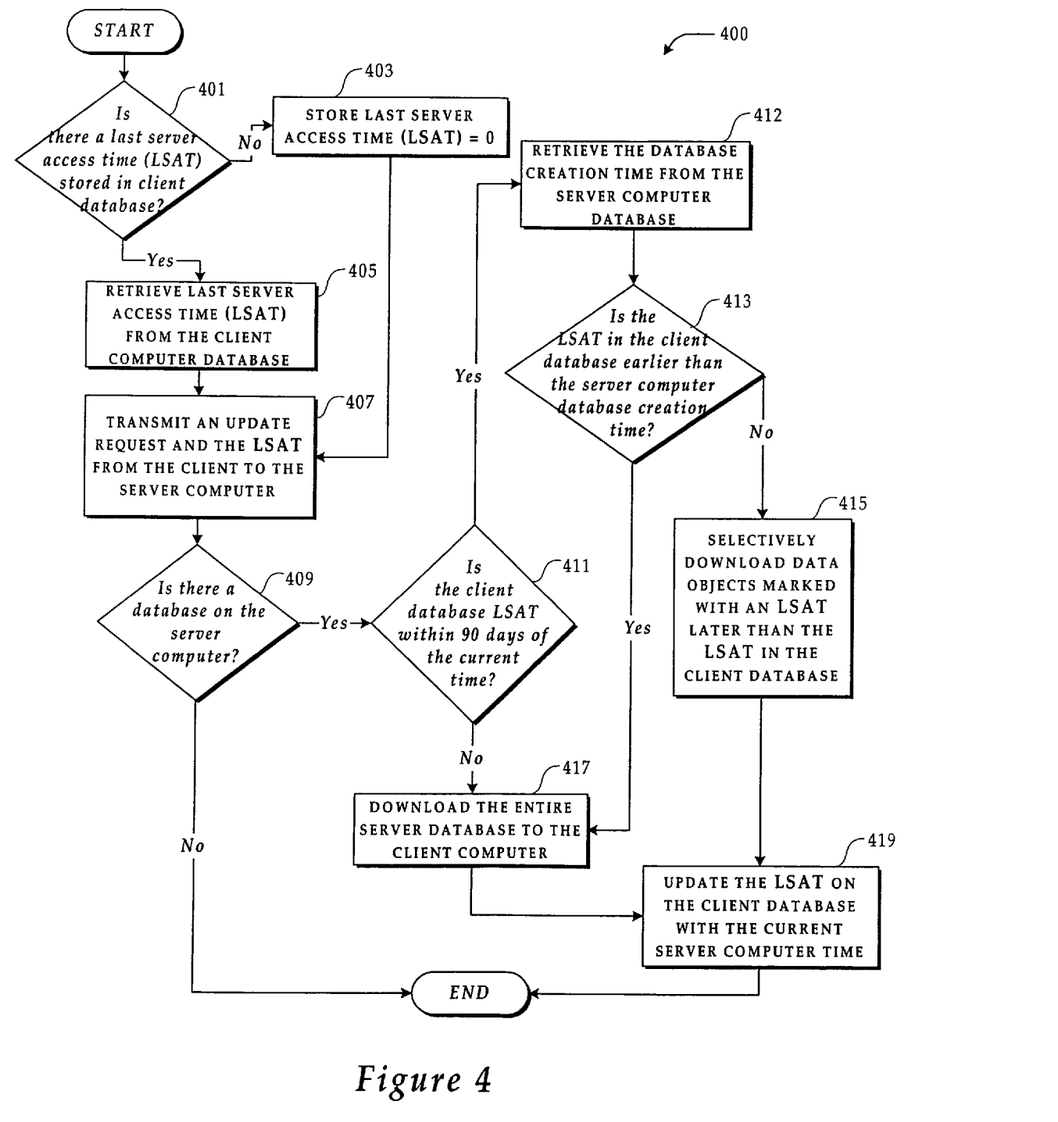
FIG. 4 is a flow diagram illustrating a data synchronization routine formed in accordance with this invention executed on a client-server computer system.

FIG. 4 illustrates a synchronization routine 400 formed in accordance with the present invention that efficiently updates a client computer database from a server computer database. In a configuration where a duplicated database may be stored on the server computer 82 and many client computers, the synchronization routine 400 allows the server computer 82 to efficiently update the databases stored on any of client computers regardless of order in which the client computers contact the server computer 82. The updating is accomplished in a way that avoids data errors by synchronizing client computer database to the server computer database and requiring that client computers update the server computer database before synchronization. The synchronization routine 400 illustrated in FIG. 4 and described below also provides efficient data transfer between the client and server computers by minimizing the amount of data traffic communicated between two computing devices required to transfer data. The following describes the synchronization routine 400 as the routine is executed between the server computer 82 and one client computer 20 requesting a database update.

The synchronization routine 400 starts when the client computer 20 receives a user or computer command to synchronize the client computer database or after the client computer has updated the server computer database. First, as shown in block 401, the synchronization routine 400 starts with the client computer 20 accessing its local database to determine if there is a last server access time (LSAT) stored in the local database. This is accomplished by the client computer 20 accessing the database field storing the LSAT and determining if a LSAT is stored in the field.

If, at decision block 401, the client computer 20 determines that the client computer database does not contain a LSAT, the client computer database has never been synchronized with the server computer database. In this case, the synchronization routine 400 continues at block 403 where the client computer 20 sets the client computer database LSAT to a null value. In this example, when the client computer 20 does not detect a LSAT, the LSAT value is set to zero.

Alternatively, if, at decision block 401, the client computer 20 determines that the client database contains an LSAT, the synchronization routine 400 continues at block 405 where the client computer 20 retrieves the last server access time (LSAT) from the client database file. In this part of the process, it is preferred that the LSAT is an exact time, e.g., year, month, date, hour, minutes, and seconds. The retrieved LSAT, or set LSAT value, is stored in memory for subsequent transmission.

The synchronization routine 400 then continues at block 407 where the client computer 20 transmits an update request and the stored LSAT to the server computer 82. As described in more detail below with reference to blocks 411 and 413, the LSAT sent from the client computer 20 to the server computer 82 is used for a comparison performed on the server computer 82 to determine which type of download the server computer 82 will perform. The update request sent from the client computer 20 to the server computer 82 provides notice to the server computer 82 that the client computer database needs to be synchronized to the server computer database. The request for an update can be in any format known to those skilled in the art, preferably the update request contains information that identifies the client computer 20 and the associated database stored in the server computer 82. In this regard, the server computer 82 may contain a number of databases, each is associated with a user ID. In such as case, the update request may contain information such as a user ID that is used by the server computer to identify the associated database stored in the server computer 82.

Upon receiving the LSAT and the update request from the client computer 20, the synchronization routine 400 continues at decision block 409 where the server computer 82 checks for the existence of a server computer database. In this part of the process, the client computer 20 is searching for a duplicate database on the server computer 82 that may have been previously stored by a client computer. The server database may have been stored by another client computer or by the client computer 20 executing the synchronization routine 400. Preferably, duplicate databases are identified by user identification numbers or user account numbers associated with the database.

Since methods of determining the existence of a database on the server computer 82 is known to those skilled in the art, such methods are not described here. by way of example only, the determination may be based on a generic database query using the user ID received in the update request to identify the correct database. If, at decision block 409, the server computer 82 determines that there is no database stored on the server computer 82, the synchronization routine 400 terminates.

Alternatively, if at decision block 409, the server computer 82 determines that a database is stored on the server computer 82, the synchronization routine 400 continues to decision block 411 where the server computer 82 determines if the LSAT received by the server computer 82 is within a predetermined period of time of the current time. In the process of block 411, the server computer 82 compares the LSAT received by the client computer 20 with the current time maintained by a clock on the server computer 82. More specifically, in block 411, the server computer 82 determines if the client computer database has accessed the server computer database within the predetermined period of time. If the server computer 82 determines that the client computer database has not accessed the server database within the predetermined period of time, the client computer database is marked as an expired database. While in this example, the predetermined period of time is ninety days, any other time period can be used.

As described in more detail below with reference to block 413, the method of the present invention performs the determination of block 411 to reduce the likelihood of data transfer errors in the synchronization of client and server computer databases. Marking the client computer database as expired means that the client computer 20 currently being synchronized with the server computer 82 has been used infrequently. In this situation, the server computer 82 cannot guarantee that the client computer database contains all the database objects needed to receive individual data objects as a means for updating the client computer database. Therefore, if the server computer 82 determines that the client computer database has expired, the synchronization routine 400 continues at block 417 where the server computer 82 downloads the entire server computer database to the client computer 20. Preferably, in block 417, the client computer 20 saves its existing database in an archive file before replacing its existing database with the downloaded server computer database.

If, at decision block 411, the server computer 82 determines that the client computer database is not expired, the synchronization routine 400 continues at block 412 where the server computer 82 retrieves the database creation time stored in the server computer database. As mentioned above, the server computer database contains a data field storing the database creation time. Similar to the process of block 405, the server computer 82 retrieves the database creation time stored in a data field of the server computer database and, if necessary, the database creation time is stored it in the server computer memory.

The synchronization routine 400 then continues to decision block 413 where the server computer 82 determines if the LSAT stored in the client computer database is earlier than the database creation time stored in the server computer database. If, at decision block 413, the server computer 82 determines that the LSAT stored in the client computer the database is earlier than the database creation time stored in the server computer database, the routine continues at block 417 where the server computer 82 downloads the entire database from the server computer 82 to the client computer 20. As described above, process block 417 may include archiving the exiting client computer database before it is replaced by the server computer database. The path of process block 413 is followed because an earlier LSAT stored in a client computer database indicates that the existing client computer database is in error. If so, replacing the entire client computer database with the server computer database is a preferred method for recovering the correct version of the database.

Alternatively, if at decision block 413 the server computer 82 determines that the LSAT stored in the client computer database is not earlier than the database creation time stored in the server computer database, the synchronization routine 400 continues at block 415 where the server computer 82 updates the client computer 20 with individual data objects. In the process of block 415, the server computer incrementally downloads the new data objects in the server computer database that contain an data object LSAT indicating a time that is later than the LSAT stored in the client computer database. This process allows the server computer 82 to selectively transmit data objects to the client computer 20, thereby minimizing the amount of data transferred in the synchronization routine 400. The new data objects received by the client computer 20 are downloaded by the use of standard network data transfer protocols such as HTML code, XML packets, or other like forms of data transfer protocols.

After the data objects have been downloaded from the server computer 82 to the client computer 20, in block 415, the synchronization routine 400 continues at block 419 where the LSAT stored in the client computer database is updated with the current time maintained on the server computer 82. The process of block 419 is also executed after the process of block 417 where the server computer 82 downloads the entire database to the client computer 20. The current time maintained on the server computer 82 is stored in the client computer database as an LSAT to be used when the synchronization routine 400 is again executed at a later time. Once the current time of the server computer 82 is stored in the client computer database as a new LSAT, the synchronization routine 400 terminates.

Figure 5:
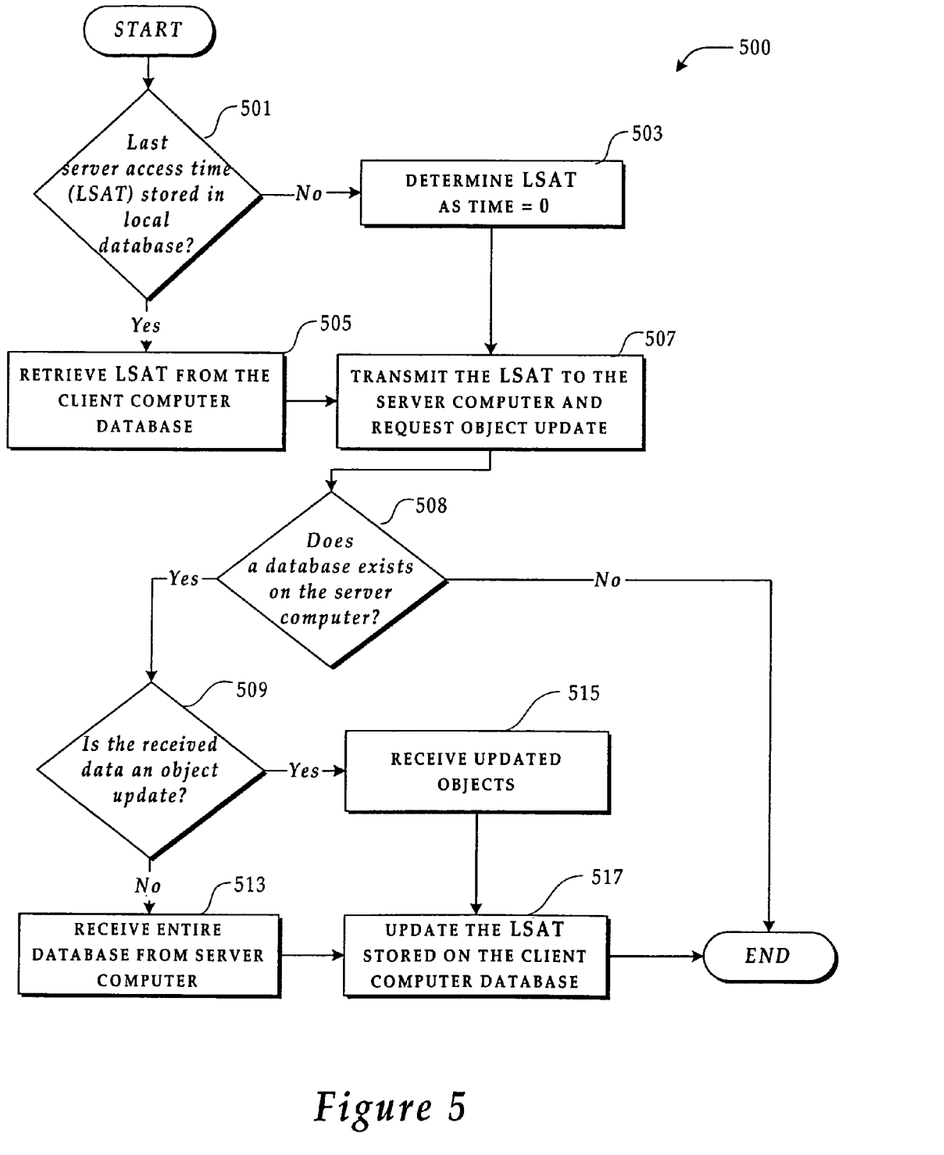
FIG. 5 is a flow diagram illustrating a data synchronization routine formed in accordance with this invention executed by a client computer.

FIG. 5 is a flow diagram illustrating the client side of the synchronization routine 400 of FIG. 4. The client executed synchronization routine 500 is executed in the same manner as the synchronization routine 400 of FIG. 4, except for the process of blocks 508–517. Because blocks 501–507 of FIG.

5 correspond to blocks 401–407 of FIG. 4 and because the operation of blocks 401–407 of FIG. 4 correspond to the operation of blocks 501–507 of FIG. 5, the operation of blocks 501–507 of FIG. 5 is not described further. The following description explains the process of blocks 508–517 of the client executed synchronization routine 500.

Starting at block decision block 508, after the client computer 20 has transmitted the update request and LSAT to the server computer (block 507), the client computer 20 makes a determination to see if there is a database stored in the server computer 82. In the process of block 508, the client computer 20 waits for a signal from the server computer 82 created in response to the update request indicating the presence or absence of a server computer database.

If, at decision block 508, the client computer 20 receives a signal indicating that the server computer 82 does not have a duplicated database, the client executed synchronization routine 500 terminates. Alternatively, if at decision block 508, the client computer 20 receives a signal indicating that the server computer 82 does have a duplicated database, the client executed synchronization routine 500 continues at block 509 where the client computer determines if data received by the client computer from the server computer is object update data.

The process of decision block 509 requires the client computer 20 to wait for a signal from the server computer 82 and upon receipt, the client computer 20 determines the how the server computer proposes to synchronize the client computer database. As described above with reference to blocks 413–417, depending on the state of the comparison of the LSAT's stored in the each database, the server computer 82 may transmit the entire server computer database or incrementally download new data objects from the server computer database to the client computer database. The process of decision block 509 allows the client computer 20 to determine the type of synchronization by receiving a signal from the server computer 82 that indicates the type of download. The signal received by the client computer may be in the form of HTML code, XML packets, or other like forms of data communication.

If, at decision block 509, the client computer 20 receives a signal indicating that the server computer 82 will perform an incremental download (an object by object update), the client executed synchronization routine 500 continues at block 515 where the client computer 20 receives updated data objects from the server computer 82. The download process of block 515 is executed in a manner similar to the download process described above with reference to block 415 of FIG. 4.

If, at decision block 509, the client computer 20 receives a signal indicating that the server computer 82 will download the entire server computer database, the client executed synchronization routine 500 continues at block 513 where the client computer 20 receives the server computer database and stores it as its current database. The download process of block 513 is executed in a manner similar to the download process described above with reference to block 417 of FIG. 4.

After the client computer 20 has either received the entire database (block 513) or after the client computer 20 has received the new data objects (block 515), the client executed synchronization routine 500 continues at block 517 where the client computer 20 updates the LSAT stored in the client computer database. The process of block 517 is executed in a manner similar to the process of block 419, as described above. In the process of block 517, the client computer 20 receives the current server time from the server computer 82 and stores the current server time in the LSAT data field for the entire client computer database. The client executed synchronization routine 500 terminates after the client computer 20 updates the LSAT stored in the client computer database.

The process of decision blocks 508 and 509 are shown as two separate processes for illustrative purposes. Although the client executed synchronization routine 500 can be executed in this manner using two separate decision processes, in another embodiment of the present invention, the process of blocks 508 and 509 can be combined. In this embodiment, after the process of block 507, the client computer 20 waits for one of four responses from the server computer 82. At this point in the process the server computer 82 can return one of four possible synchronization codes indicating: (1) no database data exists on the server computer 82, at which point, the client computer database LSAT is set to time zero and the routine 500 terminates; (2) the client computer database needs to be replaced by the server computer database (block 417 of FIG. 4); (3) the client computer database is to be incrementally updated by receiving individual data objects (block 415 of FIG. 4), or (4) the server computer has no updated data objects to return to the client computer 20. Thus, the process of decision blocks 508 and 509 allow the client computer to request for a data object update, and then depending on the signal received by the server computer 82, the client computer 20 may receive data objects or terminate the process if no data is to be downloaded from the server computer 82. In addition, the client computer 20 may also receive other signals from the server computer 82 requesting other actions from the client computer. For example, the client computer 20 may receive a signal from the server computer 82 to prompt the client computer 20 to initiate a second update request to the server computer 82 to download the entire database at a later time.

Figure 6:
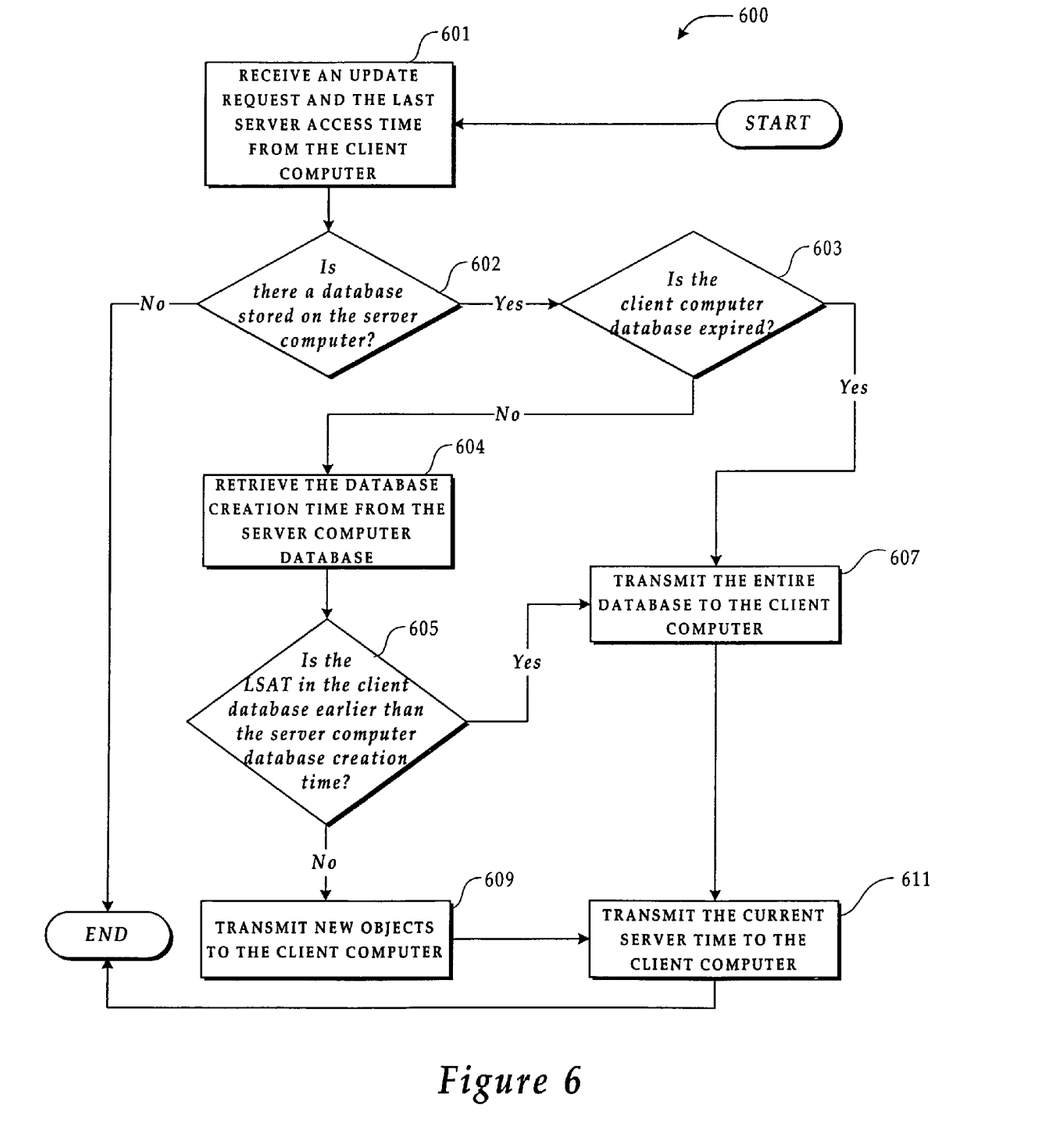
FIG. 6 is a flow diagram illustrating a data synchronization routine formed in accordance with this invention executed by a server computer.

FIG. 6 is a flow diagram illustrating the server side of the synchronization routine 400 of FIG. 4. The server executed synchronization routine 600 is executed in the same manner as the synchronization routine 400 of FIG. 4. More specifically, the process of block 601 corresponds with the process of block 407 of FIG. 4, the process of block 603 corresponds with the process of block 411, the process of block 603 corresponds with the process of block 411, the process of block 604 corresponds with the process of block 412, and the process of blocks 605–611 correspond to the process of blocks 413–419. Because these blocks of FIG. 6 correspond to the description of the corresponding blocks of FIG. 4, the operation of blocks 601–611 of FIG. 6 is not described further.

As will be readily appreciated from the foregoing description, the synchronization routine of the present invention efficiently compares the databases in the client computer and server computer and selectively downloads data objects in a way that optimally updates the client computer database. If the client computer database objects cannot be effectively updated, the client computer database is archived into a back up file on the client computer and replace with the server computer database.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for initializing a database system having one client computer and a server computer, comprising:

determining if the server computer contains a database;
copying a client computer database to the server computer, if the server computer does not contain a database;
synchronizing the client computer database with the server computer database if the server computer contains a database, wherein synchronizing the client computer database with the server computer database includes:
  receiving, at the client computer, synchronization data from the server computer;
  updating the entire client computer database with the server computer database if the synchronization data includes the server computer database; and
  updating selective client computer database data objects, if the synchronization data only includes corresponding selective server data objects;
in response to receiving a user-generated command, configuring the database for:
  storage only on the client computer;
  storage on both the client computer and the server computer;
deleting the server computer database if the server computer contains a database and if the user-generated command dictates that a database only be stored on the client computer;
determining if the client computer database last server access time is within a predetermined period of time from a clock time maintained by the server computer; and
downloading the server computer database to the client computer, if the client computer database last server access time is not within a predetermined period of time from a clock time maintained by the server computer.

2. The method as recited in claim 1, further comprising transmitting, from the client computer to the server computer, a last access time stored on the client computer database.

3. The method as recited in claim 1, further comprising receiving an updated last server access time from the server computer, wherein the updated last server access time corresponds to a clock time maintained by the server computer.

4. A computer-readable medium bearing computer-executable instructions which, when executed, initializes a database system having one client computer and a server computer, comprising:
  determining if the server computer contains a database;
  copying a client computer database to the server computer, if the server computer does not contain a database;
  synchronizing the client computer database with the server computer database if the server computer contains a database, wherein synchronizing the client computer database with the server computer database includes:
    receiving, at the client computer, synchronization data from the server computer;
    updating the entire client computer database with the server computer database if the synchronization data includes the server computer database; and
    updating selective client computer database data objects, if the synchronization data only includes corresponding selective server data objects;
  in response to receiving a user-generated command, configuring the database for:
    storage only on the client computer;
    storage on both the client computer and the server computer;
  deleting the server computer database if the server computer contains a database and if the user-generated command dictates that a database only be stored on the client computer;
    determining if the client computer database last server access time is within a predetermined period of time from a clock time maintained by the server computer; and
    downloading the server computer database to the client computer, if the client computer database last server access time is not within a predetermined period of time from a clock time maintained by the server computer.

5. The computer-readable medium as recited in claim 4, further comprising transmitting, from the client computer to the server computer, a last access time stored on the client computer database.

6. The computer-readable medium as recited in claim 4, further comprising receiving an updated last server access time from the server computer, wherein the updated last server access time corresponds to a clock time maintained by the server computer.

7. A method for initializing a database system having one client computer and a server computer, comprising:
  determining if the server computer contains a database;
  copying a client computer database to the server computer, if the server computer does not contain a database;
  synchronizing the client computer database with the server computer database if the server computer contains a database;
  wherein synchronizing the client computer database with the server computer database includes selectively downloading data objects stored in the server computer database to the client computer database, if the client computer database last server access time indicates a time that is not earlier than a time indicated by the creation time of the server computer database;
  in response to receiving a user-generated command, configuring the database for:
    storage only on the client computer;
    storage on both the client computer and the server computer; and
  deleting the server computer database if the server computer contains a database and if the user-generated command dictates that a database only be stored on the client computer.

8. The method as recited in claim 7, further comprising updating the last server access time stored in the client computer database, wherein the updated last server access time corresponds to a clock time maintained by the server computer.

9. The method as recited in claim 7, wherein selectively downloading data objects stored in the server computer database to the client computer database includes determining if the last server access time of one data object stored in the server computer database indicates a time later than a time indicated by the client computer database last server access time.

10. The method as recited in claim 9, further comprising if the last server access time of the one data object stored in the server computer database indicates a time later than a time indicated by the client computer database last server access time, downloading the one data object stored in the server computer database to the client computer database.

11. A computer-readable medium bearing computer-executable instructions which, when executed, initializes a database system having one client computer and a server computer, comprising:

determining if the server computer contains a database;
 copying a client computer database to the server computer, if the server computer does not contain a database;
 synchronizing the client computer database with the server computer database if the server computer contains a database;
 wherein synchronizing the client computer database with the server computer database includes selectively downloading data objects stored in the server computer database to the client computer database, if the client computer database last server access time indicates a time that is not earlier than a time indicated by the creation time of the server computer database;
 in response to receiving a user-generated command, configuring the database for:
  storage only on the client computer;
  storage on both the client computer and the server computer; and
  deleting the server computer database if the server computer contains a database and if the user-generated command dictates that a database only be stored on the client computer.

12. The computer-readable medium as recited in claim 11, further comprising updating the last server access time stored in the client computer database, wherein the updated last server access time corresponds to a clock time maintained by the server computer.

13. The computer-readable medium as recited in claim 11, wherein selectively downloading data objects stored in the server computer database to the client computer database includes determining if the last server access time of one data object stored in the server computer database indicates a time later than a time indicated by the client computer database last server access time.

14. The computer-readable medium as recited in claim 13, further comprising if the last server access time of the one data object stored in the server computer database indicates a time later than a time indicated by the client computer database last server access time, downloading the one data object stored in the server computer database to the client computer database.

* * * * *